United States Patent
Weagle

(10) Patent No.: US 12,344,346 B2
(45) Date of Patent: Jul. 1, 2025

(54) CYCLE SUSPENSION WITH TRAVEL INDICATOR

(71) Applicant: Specialized Bicycle Components, Inc., Morgan Hill, CA (US)

(72) Inventor: David Weagle, Edgartown, MA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 98 days.

(21) Appl. No.: 18/487,699

(22) Filed: Oct. 16, 2023

(65) Prior Publication Data

US 2024/0300613 A1    Sep. 12, 2024

Related U.S. Application Data

(63) Continuation of application No. 17/654,497, filed on Mar. 11, 2022, now Pat. No. 11,820,457, which is a continuation of application No. 16/161,804, filed on Oct. 16, 2018, now Pat. No. 11,273,887.

(51) Int. Cl.
| | |
|---|---|
| *B62K 25/24* | (2006.01) |
| *G01B 3/00* | (2006.01) |
| *G01B 5/24* | (2006.01) |

(52) U.S. Cl.
CPC .............. *B62K 25/24* (2013.01); *G01B 3/004* (2013.01); *G01B 5/24* (2013.01)

(58) Field of Classification Search
CPC ........... B62K 25/24; G01B 3/004; G01B 5/24
USPC .......................................................... 280/276
See application file for complete search history.

(56) References Cited

U.S. PATENT DOCUMENTS

| | | | |
|---|---|---|---|
| 389,200 | A | 9/1888 | Clegg |
| 393,387 | A | 11/1888 | Norton |
| 400,727 | A | 4/1889 | Baudreau |
| 412,322 | A | 10/1889 | Copeland |
| 414,048 | A | 10/1889 | Hunter |
| 423,471 | A | 3/1890 | Easthope |
| 426,402 | A | 4/1890 | Torkelson |
| 435,477 | A | 9/1890 | Blackledge |
| 441,649 | A | 12/1890 | Dunlop |
| 443,266 | A | 12/1890 | Bell |

(Continued)

FOREIGN PATENT DOCUMENTS

| | | |
|---|---|---|
| BE | 507753 | 12/1951 |
| CA | 474575 | 6/1951 |

(Continued)

OTHER PUBLICATIONS

Anubi et al., "Variable stiffness suspension system", Mechanical Sciences, vol. 4:139-151 (2013), www.mech-sci-net/4/139/2013.

(Continued)

*Primary Examiner* — Jacob D Knutson
(74) *Attorney, Agent, or Firm* — KNOBBE, MARTENS, OLSON & BEAR, LLP

(57) ABSTRACT

A suspension assembly for a cycle includes a link and an indicator having a central opening. The indicator includes a first retention feature. A pivot assembly is disposed in the link. The pivot assembly includes a second retention feature. The first retention feature and the second retention feature cooperate to axially retain the indicator on the pivot assembly while allowing rotational movement between the indicator and the pivot assembly when a force threshold is exceeded.

20 Claims, 6 Drawing Sheets

(56) References Cited

U.S. PATENT DOCUMENTS

| | | |
|---|---|---|
| 444,639 A | 1/1891 | O'Neill |
| 447,234 A | 2/1891 | Donnelly |
| 467,794 A | 1/1892 | Ellis |
| 468,643 A | 2/1892 | Clement |
| 524,389 A | 8/1894 | La Casse |
| 602,354 A | 4/1898 | Ohlgart |
| 638,723 A | 12/1899 | Kelly |
| 739,476 A | 9/1903 | Becker |
| 783,236 A | 2/1905 | Ashburn |
| 848,324 A | 3/1907 | Sager |
| 913,961 A | 3/1909 | Levedahl |
| 927,989 A | 7/1909 | Meiser |
| 940,245 A | 11/1909 | Gates |
| 946,143 A | 1/1910 | Levedahl |
| 953,697 A | 4/1910 | Kuebodeaux |
| 973,071 A | 10/1910 | Redmond |
| 979,674 A | 12/1910 | Kittle et al. |
| 980,999 A | 1/1911 | Pommer |
| 989,638 A | 4/1911 | Pilgrm |
| 1,000,115 A | 8/1911 | Oquist |
| 1,036,263 A | 8/1912 | Kittle |
| 1,042,480 A | 10/1912 | Ridgway |
| 1,077,105 A | 10/1913 | Stewart |
| 1,096,417 A | 5/1914 | Ekstrom |
| 1,101,614 A | 6/1914 | Bramham |
| 1,132,829 A | 3/1915 | Cobb |
| 1,144,753 A | 6/1915 | Budroe |
| 1,166,156 A | 12/1915 | Shimmin |
| 1,189,874 A | 7/1916 | Schickel |
| 1,203,927 A | 11/1916 | Stagni |
| 1,213,995 A | 1/1917 | Anderson |
| 1,223,572 A | 4/1917 | Drew |
| 1,227,634 A | 5/1917 | Lake |
| 1,251,992 A | 1/1918 | Drew |
| 1,254,798 A | 1/1918 | Harley |
| 1,273,179 A | 7/1918 | Perry et al. |
| 1,298,958 A | 4/1919 | Johnston |
| 1,333,449 A | 3/1920 | Russell |
| 1,365,524 A | 1/1921 | Mellantine |
| 1,397,850 A | 11/1921 | Yoxall et al. |
| 1,432,376 A | 10/1922 | Wolff |
| 1,452,436 A | 4/1923 | Pullin |
| 1,475,044 A | 11/1923 | Bloom |
| 1,517,146 A | 11/1924 | Bloom |
| 1,527,133 A | 2/1925 | Harley |
| 1,605,680 A | 11/1926 | Merkel |
| 1,834,308 A | 12/1931 | Harley |
| 1,924,363 A | 8/1933 | Kanai |
| 1,924,586 A | 8/1933 | Zerk |
| 1,999,394 A | 4/1935 | Burnett |
| 2,038,011 A | 4/1936 | Spiegler et al. |
| 2,063,704 A | 12/1936 | Slack |
| 2,073,736 A | 3/1937 | Duffy |
| 2,087,299 A | 7/1937 | Pribil |
| 2,160,034 A | 5/1939 | Schwinn |
| 2,170,565 A | 8/1939 | Macbeth |
| 2,203,342 A | 6/1940 | Sloman |
| 2,233,313 A | 2/1941 | Hazelroth |
| 2,271,304 A | 1/1942 | Mulholland |
| 2,376,788 A | 5/1945 | Latscher-Latka |
| 2,462,711 A | 2/1949 | Barnett |
| 2,463,310 A | 3/1949 | Probst |
| 2,464,326 A | 3/1949 | MacGregor |
| 2,475,774 A | 7/1949 | Benson |
| 2,485,484 A | 10/1949 | Dean |
| 2,486,430 A | 11/1949 | Moore |
| 2,489,821 A | 11/1949 | Ryder |
| 2,504,452 A | 4/1950 | Rostan |
| 2,525,171 A | 10/1950 | Franks |
| 2,537,679 A | 1/1951 | Kraeft |
| 2,540,585 A | 2/1951 | Kranz |
| 2,543,991 A | 3/1951 | Schuricht |
| 2,550,876 A | 5/1951 | Spencer |
| 2,561,156 A | 7/1951 | Thorkildsen |
| 2,588,889 A | 3/1952 | Sherwood |
| 2,596,411 A | 5/1952 | Jordan |
| 2,636,567 A | 4/1953 | Landrum |
| 2,649,312 A | 8/1953 | Miller |
| 2,660,455 A | 11/1953 | Douglas et al. |
| 2,664,644 A | 1/1954 | Tyerman |
| 2,708,112 A | 5/1955 | Seddon et al. |
| 2,729,465 A | 1/1956 | Torre |
| 2,751,991 A | 6/1956 | Mennesson |
| 2,752,167 A | 6/1956 | Propst et al. |
| 2,756,070 A | 7/1956 | Torre |
| 2,756,832 A | 7/1956 | Dalrymple |
| 2,855,212 A | 10/1958 | Houser |
| 2,918,306 A | 12/1959 | Lewandoski |
| 2,953,395 A | 9/1960 | Turner |
| 2,969,992 A | 1/1961 | Hahn |
| 2,976,056 A | 3/1961 | Henry |
| 3,083,038 A | 3/1963 | Moulton |
| 3,133,748 A | 5/1964 | Gunnerson |
| 3,188,072 A | 6/1965 | Wustenhagen et al. |
| 3,433,318 A | 3/1969 | Packard |
| 3,673,608 A | 6/1972 | Voorman, Jr. |
| 3,694,004 A | 9/1972 | Siebers |
| 3,701,544 A | 10/1972 | Stankovich |
| 2,303,568 A | 12/1972 | McWhorter et al. |
| 3,730,553 A | 5/1973 | Harman |
| 3,774,935 A | 11/1973 | Aldrich |
| 3,942,821 A | 3/1976 | Bock |
| 3,944,254 A | 3/1976 | Inui |
| 3,954,284 A | 5/1976 | Phillips et al. |
| 3,989,261 A | 11/1976 | Kawaguchi |
| 4,030,641 A | 6/1977 | Bailey et al. |
| 4,057,264 A | 11/1977 | Suzuki et al. |
| 4,058,903 A | 11/1977 | Wilkerson |
| 4,147,371 A | 4/1979 | Morita et al. |
| 4,153,237 A | 5/1979 | Supalla |
| 4,159,123 A | 6/1979 | Petty |
| 4,162,797 A | 7/1979 | McBride |
| 4,170,369 A | 10/1979 | Strutman |
| 4,179,135 A | 12/1979 | Slater |
| 4,180,280 A | 12/1979 | Doveri |
| 4,184,695 A | 1/1980 | Roe et al. |
| 4,186,936 A | 2/1980 | Offenstadt et al. |
| 4,189,168 A | 2/1980 | Courtney |
| 4,212,481 A | 7/1980 | Ribi |
| 4,242,481 A | 12/1980 | Fannin |
| 4,265,329 A | 5/1981 | de Cortanze |
| 4,268,055 A | 5/1981 | Bell |
| 4,295,658 A | 10/1981 | Kashima |
| 4,367,882 A | 1/1983 | Alexander et al. |
| 4,388,978 A | 6/1983 | Fior |
| 4,401,316 A | 8/1983 | Miyakoshi et al. |
| 4,406,475 A | 9/1983 | Miyakoshi et al. |
| 4,408,399 A | 10/1983 | Darwood et al. |
| 4,410,196 A | 10/1983 | Ribi |
| 4,421,337 A | 12/1983 | Pratt |
| 4,422,662 A | 12/1983 | Inoue et al. |
| 4,433,850 A | 2/1984 | Miyakoshi et al. |
| 4,433,851 A | 2/1984 | Miyakoshi et al. |
| 4,437,678 A | 3/1984 | Schultz |
| 4,438,909 A | 3/1984 | Matsumoto |
| 4,444,406 A | 4/1984 | Isono |
| 4,455,032 A | 6/1984 | Kajikawa |
| 4,480,711 A | 11/1984 | Satoh et al. |
| 4,482,264 A | 11/1984 | Kodera |
| 4,520,892 A | 6/1985 | Satoh |
| 4,526,249 A | 7/1985 | Parker |
| 4,531,755 A | 7/1985 | Isono et al. |
| 4,533,153 A | 8/1985 | Tsunoda et al. |
| 4,540,190 A | 9/1985 | Moulton |
| 4,542,910 A | 9/1985 | Watanabe |
| 4,561,669 A | 12/1985 | Simons |
| 4,570,963 A | 2/1986 | Isono |
| 4,572,534 A | 2/1986 | Heyl |
| 4,576,393 A | 3/1986 | Moulton et al. |
| 4,585,245 A | 4/1986 | Rose |
| 4,616,810 A | 10/1986 | Richardson et al. |
| 4,625,985 A | 12/1986 | Nakano et al. |
| 4,629,205 A | 12/1986 | Haynes |
| 4,650,027 A | 3/1987 | de Cortanze |

(56) References Cited

U.S. PATENT DOCUMENTS

| | | | |
|---|---|---|---|
| 4,660,683 A | 4/1987 | Hayashi et al. |
| 4,685,694 A | 8/1987 | Kouyama |
| 4,702,338 A | 10/1987 | Trema |
| 4,703,839 A | 11/1987 | Yasuo et al. |
| 4,723,621 A | 2/1988 | Kawano et al. |
| 4,732,241 A | 3/1988 | Yoshida |
| 4,738,468 A | 4/1988 | Baron |
| 4,741,545 A | 5/1988 | Honma et al. |
| 4,742,884 A | 5/1988 | Ishikawa |
| 4,744,434 A | 5/1988 | Miyakoshi et al. |
| 4,770,434 A | 9/1988 | Pietro et al. |
| 4,775,163 A | 10/1988 | McGowan et al. |
| 4,776,609 A | 10/1988 | Pan et al. |
| 4,789,174 A | 12/1988 | Lawwill |
| 4,807,898 A | 2/1989 | Huntly |
| 4,809,802 A | 3/1989 | Seino et al. |
| 4,815,763 A | 3/1989 | Hartmann |
| 4,828,069 A | 5/1989 | Hatsuyama |
| 4,834,412 A | 5/1989 | Trema |
| 4,878,558 A | 11/1989 | Asakura |
| 4,881,750 A | 11/1989 | Hartmann |
| 4,890,857 A | 1/1990 | de Cortanze |
| 4,971,344 A | 11/1990 | Turner |
| 4,993,734 A | 2/1991 | Trema |
| 4,997,197 A | 3/1991 | Shultz |
| 5,009,451 A | 4/1991 | Hayashi et al. |
| 5,042,608 A | 8/1991 | Horiike et al. |
| 5,050,699 A | 9/1991 | Savard |
| 5,064,212 A | 11/1991 | Yun |
| 5,069,303 A | 12/1991 | Fuller |
| 5,069,467 A | 12/1991 | Claudio |
| 5,088,705 A | 2/1992 | Tsai |
| 5,133,223 A | 7/1992 | Morri |
| 5,156,231 A | 10/1992 | Trema |
| 5,186,481 A | 2/1993 | Turner |
| 5,193,832 A | 3/1993 | Wilson et al. |
| 5,193,833 A | 3/1993 | Reisinger |
| 5,195,766 A | 3/1993 | Dohrmann et al. |
| 5,219,211 A | 6/1993 | Tsuchida et al. |
| 5,248,159 A | 9/1993 | Moore |
| 5,249,650 A | 10/1993 | Tanaka |
| 5,269,549 A | 12/1993 | Wilson et al. |
| 5,284,352 A | 2/1994 | Chen |
| 5,299,820 A | 4/1994 | Lawwill |
| 5,308,099 A | 5/1994 | Browning |
| 5,310,203 A | 5/1994 | Chen |
| 5,320,374 A | 6/1994 | Farris et al. |
| 5,328,196 A | 7/1994 | Ohma |
| 5,350,185 A | 9/1994 | Robinson |
| 5,354,085 A | 10/1994 | Gally |
| 5,359,910 A | 11/1994 | Chang et al. |
| 5,361,864 A | 11/1994 | Tanaka |
| 5,380,026 A | 1/1995 | Robinson |
| 5,403,028 A | 4/1995 | Trimble |
| 5,405,159 A | 4/1995 | Klein et al. |
| 5,409,248 A | 4/1995 | Williams |
| 5,413,368 A | 5/1995 | Pong et al. |
| 5,417,446 A | 5/1995 | Pileggi |
| 5,427,208 A | 6/1995 | Motobu et al. |
| 5,427,397 A | 6/1995 | Chonan |
| 5,429,380 A | 7/1995 | Lawwill |
| 5,431,426 A | 7/1995 | Ijams et al. |
| 5,441,291 A | 8/1995 | Girvin, III |
| 5,449,155 A | 9/1995 | Mack |
| 5,456,480 A | 10/1995 | Turner et al. |
| 5,462,302 A | 10/1995 | Leitner |
| 5,474,318 A | 12/1995 | Castellano |
| 5,487,223 A | 1/1996 | Krane |
| D368,054 S | 3/1996 | Behrens et al. |
| 5,498,013 A | 3/1996 | Hwang |
| 5,509,674 A | 4/1996 | Browning |
| 5,509,676 A | 4/1996 | Fukuake et al. |
| 5,564,534 A | 10/1996 | Toyoda et al. |
| 5,599,034 A | 2/1997 | Brigden |
| 5,615,756 A | 4/1997 | Grundei et al. |
| 5,709,399 A | 1/1998 | Smith, Jr. |
| 5,720,473 A | 2/1998 | Thomas |
| 5,743,547 A | 4/1998 | Voss et al. |
| 5,743,574 A | 4/1998 | Kohn |
| 5,749,590 A | 5/1998 | Roerig |
| 5,782,313 A | 7/1998 | Kurawaki et al. |
| 5,799,963 A | 9/1998 | Berkmann |
| 5,810,102 A | 9/1998 | Stewart |
| 5,813,684 A | 9/1998 | Baron |
| 5,829,773 A | 11/1998 | Rajaee |
| 5,855,388 A | 1/1999 | Brewer |
| 5,899,478 A | 5/1999 | Woodside |
| 5,908,200 A | 6/1999 | Stewart |
| 5,927,741 A | 7/1999 | Chi |
| 5,931,487 A | 8/1999 | Koppelberg et al. |
| 5,931,489 A | 8/1999 | Damman et al. |
| 5,951,033 A | 9/1999 | Winter et al. |
| 6,017,047 A | 1/2000 | Hoose |
| 6,036,211 A | 3/2000 | Nohr |
| 6,047,981 A | 4/2000 | Burrows |
| 6,089,585 A | 7/2000 | Theobald |
| 6,149,173 A | 11/2000 | Bynoe |
| 6,152,472 A | 11/2000 | Woodside |
| 6,155,370 A | 12/2000 | Iwai et al. |
| 6,161,858 A | 12/2000 | Tseng |
| 6,164,424 A | 12/2000 | Girvin et al. |
| 6,164,675 A | 12/2000 | Pickering |
| 6,199,885 B1 | 3/2001 | Seidl |
| 6,241,391 B1 | 6/2001 | Hoose |
| 6,244,609 B1 | 6/2001 | Wilson |
| 6,260,869 B1 | 7/2001 | Hanlon et al. |
| 6,260,870 B1 | 7/2001 | Fan |
| 6,263,994 B1 | 7/2001 | Eitel |
| 6,311,961 B1 | 11/2001 | Julia |
| 6,336,647 B1 | 1/2002 | Iwai et al. |
| 6,357,775 B1 | 3/2002 | Iwai et al. |
| 6,371,263 B1 | 4/2002 | Hoose |
| 6,382,374 B1 | 5/2002 | Iwai et al. |
| 6,386,567 B1 * | 5/2002 | Schonfeld ............ B62K 17/00 280/277 |
| 6,402,175 B1 | 6/2002 | Jansson |
| 6,457,732 B2 | 10/2002 | Ito et al. |
| 6,485,043 B2 | 11/2002 | Ito et al. |
| 6,488,300 B2 | 12/2002 | Ito et al. |
| 6,517,095 B1 | 2/2003 | Lansac et al. |
| 6,517,096 B2 | 2/2003 | Yih |
| 6,533,305 B1 | 3/2003 | Falk |
| 6,783,140 B1 | 8/2004 | Huang |
| 6,789,810 B2 | 9/2004 | Strong |
| 6,896,276 B1 | 5/2005 | Sparrow |
| 6,908,092 B2 | 6/2005 | Kofuji et al. |
| 6,910,702 B1 | 6/2005 | Hals |
| 6,918,605 B2 | 7/2005 | Wada et al. |
| 6,994,365 B2 | 2/2006 | Kofuji |
| 7,011,325 B2 | 3/2006 | Kinzler et al. |
| 7,047,831 B2 | 5/2006 | Reynolds et al. |
| 7,140,627 B2 | 11/2006 | Wimmer |
| 7,159,883 B2 | 1/2007 | Mydiarz |
| 7,210,695 B2 | 5/2007 | Griffiths |
| 7,331,594 B2 | 2/2008 | Wimmer |
| 7,350,787 B2 | 4/2008 | Voss |
| 7,364,178 B2 | 4/2008 | Wimmer |
| 7,425,008 B2 | 9/2008 | Pokrywka |
| 7,425,009 B2 | 9/2008 | Namazue et al. |
| 7,434,823 B2 | 10/2008 | Robinson et al. |
| 7,441,622 B2 | 10/2008 | Costa |
| 7,635,141 B2 | 12/2009 | O'Connor |
| 7,699,330 B2 | 4/2010 | Chen |
| 7,708,296 B2 | 5/2010 | Becker et al. |
| 7,744,107 B2 | 6/2010 | Chen |
| 7,887,077 B2 | 2/2011 | Thiers |
| 7,896,379 B2 | 3/2011 | Nagao et al. |
| 8,333,528 B2 | 12/2012 | Oertley et al. |
| 8,448,970 B1 | 5/2013 | Vardon |
| 8,534,692 B2 | 9/2013 | Trebichavsky |
| 8,939,458 B2 | 1/2015 | Nesbitt, III |
| 9,194,456 B2 | 11/2015 | Laird et al. |
| 9,248,883 B2 | 2/2016 | D'Aluisio |
| 9,278,598 B2 | 3/2016 | Galasso et al. |

(56) References Cited

U.S. PATENT DOCUMENTS

| | | |
|---|---|---|
| 9,592,838 B1 | 3/2017 | Mecklenburg et al. |
| 9,682,741 B2 | 6/2017 | Fioravanzo et al. |
| 9,707,817 B1 | 7/2017 | Arnott et al. |
| 9,724,701 B2 | 8/2017 | Harney et al. |
| 10,053,166 B2 | 8/2018 | Moriguchi et al. |
| 10,094,683 B1 | 10/2018 | Przykucki et al. |
| 10,099,743 B2 | 10/2018 | Walthert et al. |
| 10,196,106 B1 | 2/2019 | Weagle |
| 10,300,979 B2 | 5/2019 | Weagle |
| 10,308,312 B2 | 6/2019 | Weagle |
| D859,125 S | 9/2019 | Weagle et al. |
| D860,061 S | 9/2019 | Weagle et al. |
| D860,062 S | 9/2019 | Weagle |
| D861,542 S | 10/2019 | Weagle |
| 10,518,836 B2 | 12/2019 | Weagle |
| 10,518,839 B2 | 12/2019 | Weagle |
| 10,526,039 B2 | 1/2020 | Weagle |
| 10,526,040 B2 | 1/2020 | Weagle |
| 10,537,790 B2 | 1/2020 | Galasso et al. |
| 10,549,812 B2 | 2/2020 | Weagle |
| 10,549,813 B2 | 2/2020 | Weagle |
| 10,549,815 B2 | 2/2020 | Weagle |
| D880,369 S | 4/2020 | Weagle |
| D880,370 S | 4/2020 | Weagle |
| D880,371 S | 4/2020 | Weagle |
| D880,372 S | 4/2020 | Weagle |
| 10,689,061 B2 | 6/2020 | Weagle |
| 10,894,572 B2 | 1/2021 | Przykucki et al. |
| 10,906,601 B2 | 2/2021 | Aoki et al. |
| 11,084,552 B2 | 8/2021 | Weagle |
| 11,117,635 B2 | 9/2021 | Przykucki, Jr. et al. |
| 11,208,172 B2 | 12/2021 | Weagle |
| 11,230,346 B2 | 1/2022 | Weagle |
| 11,230,347 B2 | 1/2022 | Weagle |
| 11,230,348 B2 | 1/2022 | Weagle |
| 11,273,887 B2 * | 3/2022 | Weagle .............. G01B 3/004 |
| 11,345,432 B2 | 5/2022 | Weagle |
| 11,524,744 B2 | 12/2022 | Weagle |
| 11,820,457 B2 * | 11/2023 | Weagle .............. B62J 50/23 |
| 11,945,539 B2 | 4/2024 | Weagle |
| 2001/0019197 A1 | 9/2001 | Ito et al. |
| 2002/0005066 A1 | 1/2002 | Tanner et al. |
| 2002/0079670 A1 | 6/2002 | Yih |
| 2002/0084619 A1 | 7/2002 | Odom |
| 2004/0036250 A1 | 2/2004 | Kofuji |
| 2005/0248119 A1 | 11/2005 | Callahan et al. |
| 2008/0023934 A1 | 1/2008 | van Houweling |
| 2008/0041681 A1 | 2/2008 | Shipman |
| 2008/0060863 A1 | 3/2008 | Iizuka |
| 2008/0258424 A1 | 10/2008 | Paul |
| 2008/0277848 A1 | 11/2008 | Davis |
| 2008/0296863 A1 | 12/2008 | Heyl et al. |
| 2008/0303242 A1 | 12/2008 | O'Connor |
| 2009/0001684 A1 | 1/2009 | McAndrews et al. |
| 2009/0033009 A1 | 2/2009 | Kirchner et al. |
| 2009/0266656 A1 | 10/2009 | Murakami |
| 2010/0010709 A1 | 1/2010 | Song |
| 2010/0244340 A1 | 9/2010 | Wootten et al. |
| 2011/0012321 A1 | 1/2011 | Chen |
| 2011/0083930 A1 | 4/2011 | Laird et al. |
| 2011/0093930 A1 | 4/2011 | Bartel-Kurz et al. |
| 2011/0156728 A1 | 6/2011 | Sato et al. |
| 2011/0313568 A1 | 12/2011 | Blackwell et al. |
| 2012/0228850 A1 | 9/2012 | Tseng |
| 2012/0248666 A1 | 10/2012 | Debruler et al. |
| 2014/0061987 A1 | 3/2014 | DeBruler et al. |
| 2014/0202809 A1 | 7/2014 | Ozaki et al. |
| 2014/0316652 A1 | 10/2014 | Ericksen et al. |
| 2015/0183440 A1 | 7/2015 | Jackson |
| 2015/0317065 A1 | 11/2015 | Meriaz et al. |
| 2015/0375823 A1 | 12/2015 | Fioravanzo et al. |
| 2016/0288867 A1 | 10/2016 | Murakami |
| 2016/0339987 A1 | 11/2016 | Walthert et al. |
| 2016/0339989 A1 | 11/2016 | Walthert et al. |
| 2017/0043818 A1 | 2/2017 | Moriguchi et al. |
| 2017/0087932 A1 | 3/2017 | Winshtein et al. |
| 2017/0198779 A1 | 7/2017 | Batsch et al. |
| 2017/0219041 A1 | 8/2017 | Debruler et al. |
| 2017/0284493 A1 | 10/2017 | Smith |
| 2018/0281878 A1 | 10/2018 | Aoki et al. |
| 2018/0297435 A1 | 10/2018 | Brady et al. |
| 2018/0304952 A1 | 10/2018 | Krugman et al. |
| 2018/0334219 A1 | 11/2018 | Walthert et al. |
| 2019/0031275 A1 | 1/2019 | Weagle |
| 2019/0031276 A1 | 1/2019 | Weagle |
| 2019/0031277 A1 | 1/2019 | Weagle |
| 2019/0039681 A1 | 2/2019 | Weagle |
| 2019/0047657 A1 | 2/2019 | Weagle |
| 2019/0047658 A1 | 2/2019 | Weagle |
| 2019/0061865 A1 | 2/2019 | Weagle |
| 2019/0061866 A1 | 2/2019 | Weagle |
| 2019/0061867 A1 | 2/2019 | Weagle |
| 2019/0061868 A1 | 2/2019 | Weagle |
| 2019/0092116 A1 | 3/2019 | Magnus et al. |
| 2019/0168838 A1 | 6/2019 | Weagle |
| 2020/0079462 A1 | 3/2020 | Weagle |
| 2020/0079463 A1 | 3/2020 | Weagle |
| 2020/0094908 A1 | 3/2020 | Weagle |
| 2020/0094910 A1 | 3/2020 | Weagle |
| 2020/0354012 A1 | 11/2020 | Pelot |
| 2021/0323632 A1 | 10/2021 | Weagle |
| 2022/0097792 A1 | 3/2022 | Przykucki, Jr. et al. |
| 2022/0153381 A1 | 5/2022 | Zawistowski et al. |
| 2022/0204123 A1 | 6/2022 | Weagle |
| 2022/0363335 A1 | 11/2022 | Weagle |
| 2022/0363336 A1 | 11/2022 | Weagle |
| 2023/0023390 A1 | 1/2023 | Weagle |
| 2023/0271670 A1 | 8/2023 | Weagle |

FOREIGN PATENT DOCUMENTS

| | | |
|---|---|---|
| CH | 63758 | 2/1914 |
| CN | 1309053 | 8/2001 |
| CN | 2846274 Y | 12/2006 |
| CN | 201198348 | 2/2009 |
| CN | 302966622 | 10/2014 |
| CN | 303438302 | 11/2015 |
| CN | 303584666 | 2/2016 |
| CN | 303604532 | 3/2016 |
| CN | 304240449 | 8/2017 |
| CN | 304327156 | 10/2017 |
| DE | 1084599 | 6/1960 |
| DE | 1122392 | 1/1962 |
| DE | 3133576 | 5/1983 |
| DE | 3223728 | 12/1983 |
| DE | 8906328 | 11/1989 |
| DE | 3833880 | 4/1990 |
| DE | 4119339 | 1/1992 |
| DE | 9404873 | 5/1994 |
| DE | 9403640 | 6/1994 |
| DE | 9414705 | 2/1995 |
| DE | 19503047 | 8/1996 |
| DE | 19635939 | 6/1997 |
| DE | 19633692 | 2/1998 |
| DE | 10-2013-004788 | 9/2013 |
| DK | 49600 | 12/1934 |
| EP | 0032170 | 2/1986 |
| EP | 0030306 | 4/1986 |
| EP | 0125244 | 1/1987 |
| EP | 0399615 | 11/1990 |
| EP | 0336891 | 7/1992 |
| EP | 420610 | 2/1996 |
| EP | 726198 | 8/1996 |
| EP | 0744562 | 11/1996 |
| EP | 0731017 | 10/1997 |
| EP | 888959 A2 * | 1/1999 ............. B62K 25/30 |
| EP | 0941916 | 9/1999 |
| EP | 0992374 | 4/2000 |
| EP | 1049618 | 9/2003 |
| EP | 728093 | 11/2005 |
| EP | 02000398 | 12/2008 |
| EP | 01884455 | 4/2009 |
| EP | 2096024 | 9/2009 |
| EP | 2100807 | 9/2009 |

(56) References Cited

FOREIGN PATENT DOCUMENTS

| | | |
|---|---|---|
| EP | 2357098 | 8/2011 |
| EP | 02001733 | 12/2012 |
| EP | 2483141 | 11/2013 |
| EP | 02913257 | 9/2015 |
| FR | 347724 | 3/1905 |
| FR | 353990 | 9/1905 |
| FR | 350269 | 12/1905 |
| FR | 376759 | 8/1907 |
| FR | 467213 | 6/1914 |
| FR | 547006 | 11/1922 |
| FR | 559088 | 9/1923 |
| FR | 28240 | 1/1925 |
| FR | 636211 | 4/1928 |
| FR | 902973 | 9/1945 |
| FR | 972653 | 2/1951 |
| FR | 1030006 | 6/1953 |
| FR | 1032268 | 6/1953 |
| FR | 1059922 | 3/1954 |
| FR | 1064265 | 5/1954 |
| FR | 1067221 | 6/1954 |
| FR | 1082316 | 12/1954 |
| FR | 2418742 | 9/1979 |
| FR | 2494208 | 5/1982 |
| FR | 2687976 | 9/1993 |
| FR | 3004415 | 10/2014 |
| GB | 166065 | 7/1921 |
| GB | 223638 | 10/1924 |
| GB | 238069 | 8/1925 |
| GB | 239848 | 12/1925 |
| GB | 258141 | 9/1926 |
| GB | 264003 | 1/1927 |
| GB | 279630 | 11/1927 |
| GB | 302026 | 12/1928 |
| GB | 322370 | 12/1929 |
| GB | 469697 | 7/1937 |
| GB | 585122 | 1/1947 |
| GB | 585904 | 2/1947 |
| GB | 586372 | 3/1947 |
| GB | 691551 | 5/1953 |
| GB | 717259 | 10/1954 |
| GB | 720093 | 12/1954 |
| GB | 824866 | 12/1959 |
| GB | 841523 | 7/1960 |
| GB | 1540824 | 2/1979 |
| GB | 1545403 | 5/1979 |
| GB | 2038736 | 7/1980 |
| GB | 2052407 | 1/1981 |
| GB | 2073680 | 10/1981 |
| GB | 2106843 | 4/1983 |
| JP | S60-110588 | 6/1985 |
| JP | S61-124683 | 2/1986 |
| JP | S61-160380 | 7/1986 |
| JP | S62-187608 | 8/1987 |
| JP | 63-112191 U | 7/1988 |
| JP | 649887 U | 1/1989 |
| JP | 1204884 | 8/1989 |
| JP | 5069875 | 3/1993 |
| JP | 05-020635 | 5/1993 |
| JP | 1999-091671 | 4/1999 |
| JP | 2000159170 | 6/2000 |
| JP | 2000159171 | 6/2000 |
| JP | 2000159177 | 6/2000 |
| JP | 2000159178 | 6/2000 |
| JP | 2000168666 | 6/2000 |
| KR | 10-2009-0117921 | 11/2009 |
| TW | 416920 | 1/2001 |
| TW | 484570 U | 4/2002 |
| TW | 568054 U | 12/2003 |
| TW | 596028 | 6/2004 |
| TW | D111693 | 7/2006 |
| TW | M335458 U | 7/2008 |
| TW | M354565 U | 4/2009 |
| TW | D140125 | 4/2011 |
| TW | D149623 | 10/2012 |
| TW | 2017-22777 | 7/2017 |
| WO | WO 1982/00445 | 2/1982 |
| WO | WO 1984/00526 | 2/1984 |
| WO | WO 1987/01670 | 3/1987 |
| WO | WO 1995/23728 | 9/1995 |
| WO | WO 1997/46443 | 12/1997 |
| WO | WO 1999/10224 | 3/1999 |
| WO | WO 2000/013961 | 3/2000 |
| WO | WO 2002/038437 | 5/2002 |
| WO | WO 2019/046039 | 3/2019 |
| WO | WO 2019/046040 | 3/2019 |
| WO | WO 2021/066819 | 4/2021 |

OTHER PUBLICATIONS

Black and white photograph of Greeves trials machine, Applicant Admitted Prior Art, Applicant's internal files.
Black and white photograph of Scorpion motorcycle, Applicant Admitted Prior Art, Applicant's internal files.
Black and white photograph of Silencer motorcycle, Applicant Admitted Prior Art, Applicant's internal files.
Color photograph of a cotton TC-70 motorcycle, Applicant Admitted Prior Art, Applicant's internal files.
Color photograph of Armstrong bicycle, Applicant Admitted Prior Art, Applicant's Internal Files.
Color photograph of Armstrong motorcycle, Applicant Admitted Prior Art, Applicant's internal files.

\* cited by examiner

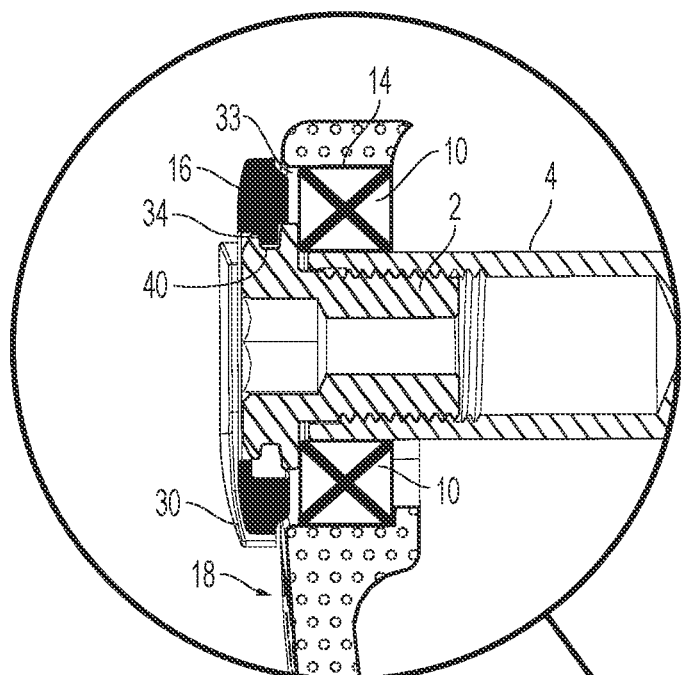
FIG. 2C
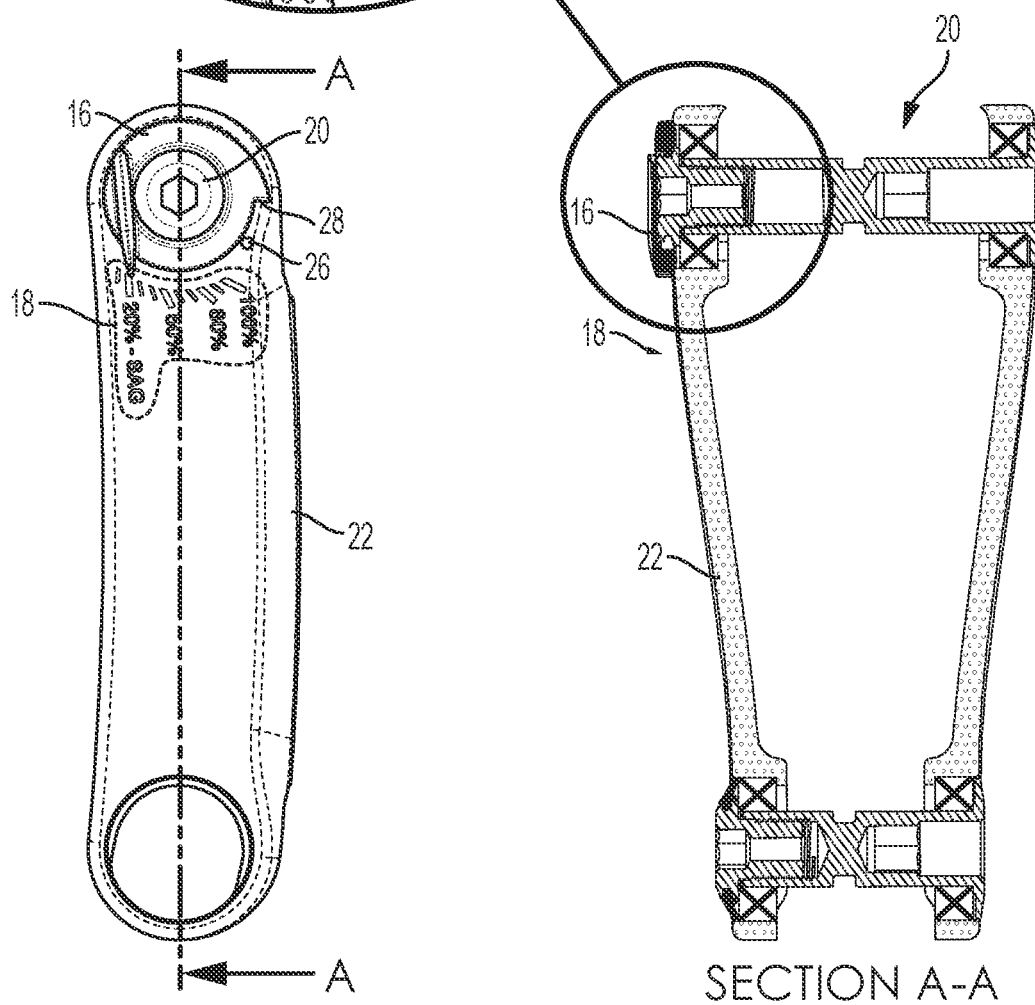
FIG. 2A
FIG. 2B

CYCLE SUSPENSION WITH TRAVEL INDICATOR

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The disclosure is generally directed to wheel suspension assemblies for cycles, and is more specifically directed to wheel suspension assemblies for cycles that include a travel indicator.

BACKGROUND

Suspensions are key components of wheeled vehicles, including cycles. Suspensions allow a wheel to move in a compliant manner in response to ground conditions as a rider pilots a cycle, while improving handling and control during riding. In many cases, suspensions comprise links and pivot assemblies which together form an articulating mechanism which allows a wheel to move. Pivot assemblies allow suspension components such as links to articulate in one or more degrees of freedom, typically via rotation.

Recently, telescopic front suspension forks have dominated suspension systems for two-wheeled vehicles. A telescopic fork includes sliding stanchions connected in a steerable manner to a cycle frame, and at the same time, includes a telescoping mechanism for wheel displacement. Few, if any telescopic forks include pivot assemblies.

Linkage front suspensions, comprising links and pivot assemblies, have been attempted in the past as an alternative to telescopic forks, yet they have failed to achieve market dominance. In contrast, linkages comprising links and pivot assemblies account for almost all the rear suspensions available for two wheeled suspension structures sold today, and almost no examples of solely telescopic or sliding rear suspension structures can be found in today's marketplace.

While linkages including links and pivot assemblies can be economically manufactured, and typically feature very low friction, and linkages are also relatively easy to seal from the elements, linkages suffer from poor kinematic performance, usually driven by prioritizing brake dive performance rather than stability.

Telescopic forks on the other hand use sliding stanchions, which require very expensive and tight manufacturing tolerances. Outer surfaces of the stanchion typically slide against bushings to allow for compliance. Front suspension for a cycle is subject to large bending forces fore and aft and less significant lateral forces. Because telescopic forks have relatively large stanchions, and relatively large siding surfaces and seals, large breakaway friction in the system (known as stiction) is generated by these components. Stiction resists compression of the suspension in reaction to bumps, which is a drawback in a suspension product where the goal is to react to road or terrain conditions, for example by deflecting in response to ground conditions, and/or absorbing impact from bumps. Additionally, as the telescopic fork is loaded in the fore/aft direction (usually on impact or braking), the bushings bind, resulting in even greater stiction at the exact moment when a rider needs the most compliance. Telescopic forks and their large sliding bushings also require smooth stanchion surfaces and significant maintenance and upkeep to keep performance from diminishing quickly.

The quality of cycle suspension performance is tied to proper setup for the rider. One of the most important measurements that can help a rider to achieve proper setup is the amount of suspension travel actuated during different riding conditions. Suspension travel is a measurement of suspension deflection during suspension compression. This measurement can help the rider to understand how much suspension displacement is being used in both static and dynamic tests, and with this knowledge, alterations such as spring force or damper settings can be made in an educated manner. Making these alterations can allow the rider to improve suspension performance according to the rider's preferences.

Measuring suspension travel on a telescopic fork or rear shock typically requires two people, one to compress the suspension and the other to measure the suspension displacement with a ruler. This is a difficult, time consuming, and frequently inaccurate method of measuring suspension displacement. External devices such as tape measures adapted for one person suspension displacement measuring have been tried with limited success. Another method involves affixing an o-ring around the stanchion or sliding shaft, and letting the o-ring contact the fork or shock seal. As the suspension compresses, the o-ring is forced along the stanchion or shaft via contact with the seal, and then when the suspension is fully extended, a measurement between measurement between the o-ring and seal can be made to determine suspension travel used. Using an o-ring to measure travel is problematic because it can trap dirt and grit against the stanchion or shaft, causing surface damage and further compromising friction, stiction, and suspension performance. Furthermore, o-rings are fragile thin section pieces of rubber that can be easily damaged or degrade over time, and in some cases are impossible or difficult to replace when damaged due to fork or shock construction.

SUMMARY

In accordance with one aspect, a suspension assembly for a cycle includes a link having a pivot assembly. An indicator having a central opening is operably connected to the pivot assembly. A scale is located on the link. The indicator includes a pointer that is offset from the center of the indicator.

In accordance with another aspect, a suspension assembly for a cycle includes a link and an indicator having a central opening. The indicator includes a first retention feature. A pivot assembly is disposed in the link. The pivot assembly includes a second retention feature. The first retention feature and the second retention feature cooperate to axially retain the indicator on the pivot assembly while allowing rotational movement between the indicator and the pivot assembly when a force threshold is exceeded.

BRIEF DESCRIPTION OF THE DRAWINGS

FIG. 2A is a side view of a link, pivot assembly, and travel indicator of the front wheel suspension assembly of FIG. 1.

FIG. 2B is a cross-sectional plan view of the link, pivot assembly, and travel indicator of FIG. 2A, taken along line A-A of FIG. 2A.

FIG. 2C is a close-up cross-sectional view of the pivot assembly and travel indicator of FIG. 2B.

DETAILED DESCRIPTION

The present invention is not limited to the specific embodiments described below, which are intended as exemplary illustrations of individual aspects of the invention. Functionally equivalent methods and components fall within the scope of the invention. Indeed, various modifications of the invention, in addition to those shown and described herein, will become apparent to those skilled in the art from the foregoing description. Such modifications are intended to fall within the scope of the appended claims. Throughout this application, the singular includes the plural and the plural includes the singular, unless indicated otherwise. The words "formed," "provided," "disposed," and "located" are used interchangeably to denote relative positioning in the instant description. All cited publications, patents, and patent applications are herein incorporated by reference in their entirety.

The disclosed travel indicator combined with multi-link cycle suspension assemblies, such as the suspension assemblies described in U.S. patent application Ser. No. 15/661,821, filed on Jul. 27, 2017; and the disclosed travel indicator may be used in conjunction with pivot assemblies such as the pivot assemblies described in U.S. patent application Ser. No. 16/153,396, filed on Oct. 5, 2018. Each of U.S. patent application Ser. Nos. 15/661,821 and 16/153,396 are hereby incorporated by reference herein.

In suspensions with pivots, attempts to measure travel via a rotating dial have been made in the past. These rotating dials suffer from a host of issues that make them difficult and inaccurate to read. For example, most rotating dials have small indicators that are difficult to read and/or read only instantaneous compression of the suspension.

Figure 1:
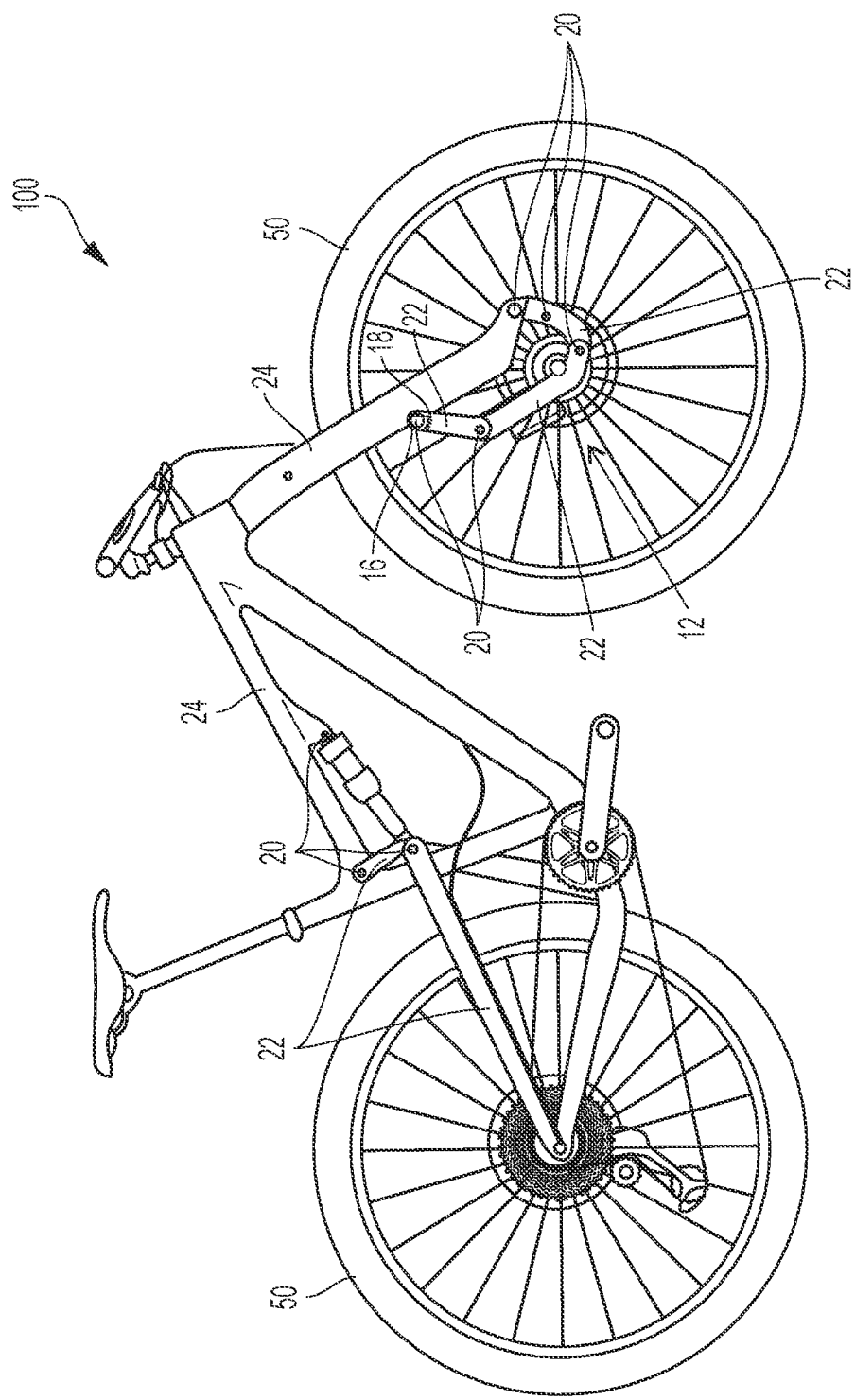
FIG. 1 is a side view of a cycle including a front wheel suspension assembly and a rear wheel suspension assembly constructed according to the teachings of the disclosure.

Turning now to FIG. 1, a cycle 100 includes a front wheel 50 and a rear wheel 50, and a front wheel suspension assembly 12 including one or more pivot assemblies 20. The pivot assembly 20 includes a plurality of pivotably connected links 22. One or more of the links 22 may be pivotably connected to a frame member, such as a fork arm 24. The frame member 24 may act as a fixed location for the pivotably connected links 22. As the front wheel 50 moves relative to the frame member, due to changing ground topography/conditions, the links 22 articulate relative to one another, and relative to the frame member 24, thus allowing the wheel 50 to move relative to the frame member 24 in a compliant manner in response to the changing ground topography/conditions as a rider pilots the cycle 100. The front wheel suspension assembly 12, and thus the links 22, improve handling and control during riding by directing movement of the wheel 50 relative to the frame member 24 in a predictable and predetermined manner.

A travel indicator 16 and scale 18 are included on one pivot assembly 20 to measure travel displacement (e.g., compression) of the front wheel suspension assembly 12, thereby providing the rider a measurement that may be used as a basis for making changes to suspension settings (e.g., changes to spring forces in a shock absorber or spring unit and/or to frictional forces in the pivot assembly) in a purposeful manner, thereby changing performance of the front wheel suspension assembly 12 and better customizing a rider's experience according to the manufacturer recommendations and/or a rider's preferences.

Turning now to FIGS. 2A-2C, the pivot assembly 20 includes a bolt 2 and a pivot body 4. The pivot assembly 20 is seated in a central aperture 33 of the housing 14. The indicator 16 is located about a circumference of the bolt 2, and the indicator 16 includes a first retention feature or protrusion 34, and a pointer 30. The bolt 2 includes a second retention feature or channel 40. In other embodiments, the second retention feature may be located about a circumference of the pivot body 4. While the first retention feature is illustrated as a protrusion 34 and the second retention feature is illustrated as a channel, in other embodiments, the protrusion 34 and the channel 40 may be reversed, or other retention features may be used that axially locate the indicator 16 relative to the pivot assembly 20 while allowing rotational movement between the indicator 16 and the pivot assembly 20 when a threshold force is exceeded. The indicator 16 may be included on either a front wheel 50 suspension and/or a rear wheel 50 suspension. In certain preferred embodiments, particularly where access to and thus measurements from a shock absorber may be limited, the indicator 16 is particularly useful in front wheel suspension assemblies 12.

The scale 18 is located on an external component, such as on the housing 14. The housing 14 may be part of a link 22, or in other embodiments, the housing may be part of a frame member, such as the fork arm 24. A bearing 10 is installed in the central aperture 33. The bearing 10 facilitates rotational movement between the pivot assembly 20 and the housing 14. The pivot assembly 20 positions the bearing 10 in radial and axial directions relative to the housing 14 such that any combination of links 22 or frame members 24 can articulate in a pivotable or rotatable manner. The first interference member 34 on the indicator 16 interfaces with, or is partially seated within, the second interference member 40 on the bolt 2, such that the first interference member 34 and second interference member 40 allow rotation of the indicator 16 when enough force is applied to overcome rotational friction and, at the same time, produce enough rotational friction to prevent rotation of the indicator 16 relative to the bolt 2 when sufficient force is not present, thereby maintaining relative positioning between the indicator 16 and the bolt 2 unless sufficient force is applied.

For example, the rotational friction between the first interference member 34 and the second interference member 40 may be overcome to cause the indicator 16 to rotate relative to the bolt 2 when force is applied to the indicator 16 by, for example, an actuator 26 during suspension assembly compression, or to return the indicator 16 to a starting position by force applied by a tool or a finger after suspension assembly is complete. By allowing the indicator 16 to rotate relative to the bolt 2 during suspension assembly compression, and by maintaining the indicator 16 rotational position relative to the bolt 2 when suspension assembly compression is complete, the indicator 16 provides a measurement of maximum suspension assembly compression for a compression event. The measurement may then be used by the rider to adjust suspension assembly characteristics to improve suspension assembly performance. While the first interference member 34 is illustrated as one or more protrusions and the second interface member 40 is illustrated as an annular channel, in other embodiments, the protrusions and the annular channel may be reversed, or other connection structures that produce rotational friction may be used. In some preferred embodiments, the indicator 16 comprises one or more of metal, plastic, composites, and compliant materials, such as natural or synthetic rubbers and urethanes. In other embodiments, the indicator comprises one or more of rubber, aluminum, steel, copper, other metals, fiberglass, carbon fiber, fiber reinforced thermoplastics, urethanes, foam, wood, and bamboo.

Figure 3C:
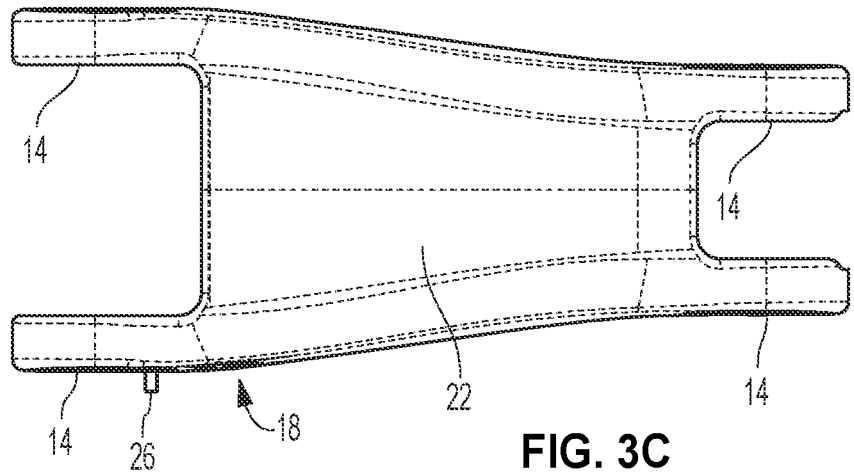
FIG. 3C is a top plan view of the link of FIG. 2A.
Figure 3B:
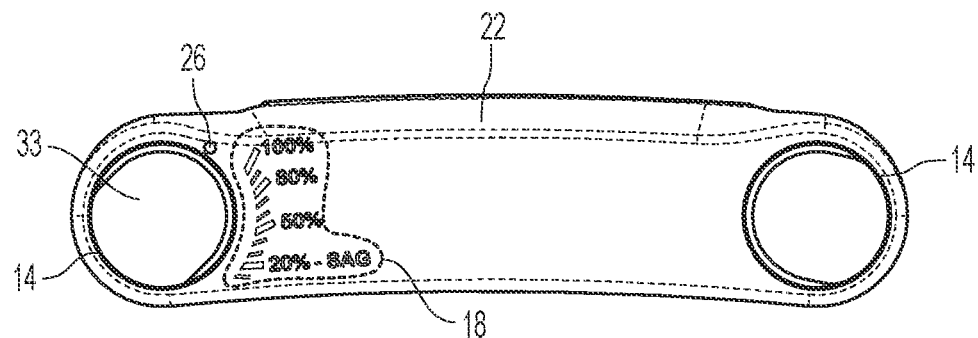
FIG. 3B is a side view of the link of FIG. 2A.
Figure 3A:
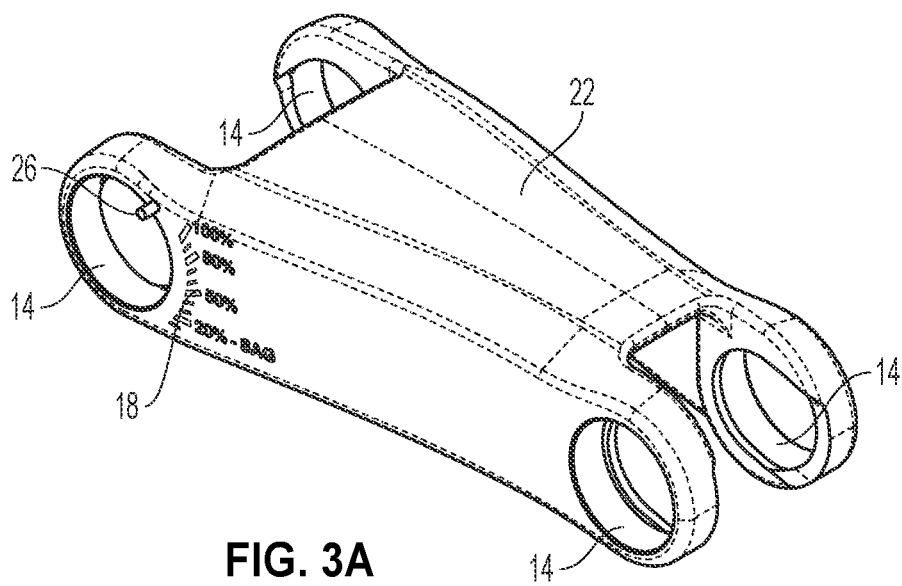
FIG. 3A is a side perspective view of the link of FIG. 2A.

Turning now to FIGS. 3A-3C, the link 22 is illustrated in several views. Although referenced and illustrated in other figures, the bearing 10 and the pivot assembly 20 are not illustrated in FIGS. 3A-3C. As discussed above, the housing 14 may be part of the link 22. The actuator 26, which in the illustrated embodiment is a peg extending outward from the housing 14, and the scale 18 are also located on the housing 14. The housing 14 interfaces with or receives the bearing 10 and/or the pivot assembly 20. The bearing 10 may be press fit or slid into the central aperture 33 in the housing 14, and the pivot assembly 20 may then be press fit or slid into the central aperture 33 in the housing 10 as well. The scale 18 is attached to, or formed on an outer surface of the housing 14 proximate the central aperture 33. The scale 18 includes graduations or indications that line up with the pointer 30 of the indicator 16 subsequent to compression of the suspension assembly 12, thereby allowing the registering and measuring of a travel reading (e.g., suspension assembly compression) for a user after the suspension assembly 12 is compressed.

Figure 4:
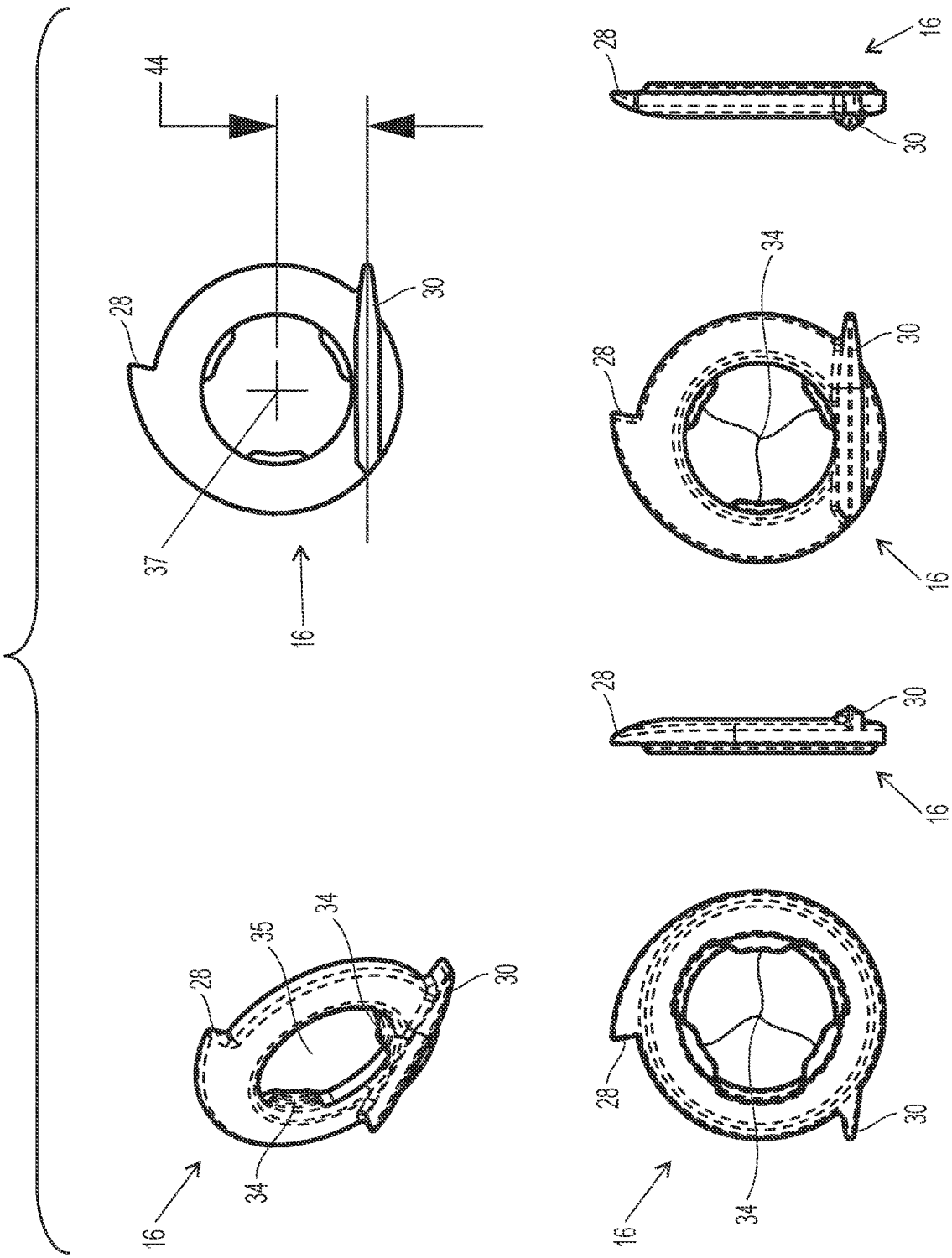
FIG. 4 includes various views of the travel indicator of FIG. 2A.

Turning now to FIG. 4, one embodiment of the indicator 16 is illustrated. As discussed above, the indicator 16 comprises the first retention feature 34, which in the illustrated embodiment is a plurality of protrusions projecting inward into a center opening 35 of the indicator, the pointer 30, which in the illustrated embodiment is a ledge that projects outward from a face of the indicator 16, and a stop member 28, which in the illustrated embodiment is a shoulder that is formed along an outer edge of the indicator 16. The stop member 28 forms a stop or buttress that cooperates with the actuator 26 during suspension assembly compression. The first interference member 34 is sized and shaped to cooperate with the second interference member 40, the protrusions seating within the channel of the second interference member 40. The seating of the first interference member 34 in the second interference member 40 allows rotation of the first interference member 34 relative to the second interference member 40 when sufficient force is applied to overcome the rotational friction between the first interference member 34 and the second interference member 40, which allows rotation of the indicator 16 relative to the bolt 2 (and thus relative to the scale 18) when force is applied to the indicator 16. The frictional interaction between the first interference member 34 and the second interference member 40 also provides enough resistance to hold the indicator 16 in place relative to the bolt 2 (and thus relative to the scale 18) when not being acted upon by outside forces.

The central aperture 35 of the indicator 16 has a center point 37 that is coincident with a central axis of the pivot assembly 20. The pointer 30 is generally linear in shape and when viewed on the face of the indicator 16 forms a chord, intersecting the outer circumference of the indicator at two locations without passing through the center 35. In other embodiments, the indicator may or may not intersect the outer circumference of the indicator 16. The pointer 30 is offset a distance 44 from the center point 37 of the indicator 16, when viewed face-on. This offset distance 44 is an important feature of the indicator 16, which allows the user to easily and accurately read the suspension travel. In some preferred embodiments, the offset distance 44 is between 50% and 90%, more preferably between 60% and 85%, of the radius of the indicator 16. By locating the pointer 30 away from the center point 37 by the offset distance 44, the pointer 30 can be much longer than other arrangements, and the pointer 30 is in a better location to cooperate with the scale 18. For example, the pointer 30 can be longer than a radius of the indicator 16. This longer offset distance 44 of the pointer 30 is easier to read more accurately, and clearly shows which graduation or value on the scale 18 is indicated during suspension travel. In certain preferred embodiments, the pointer 30 may be colored to allow easy visibility. In other embodiments, the pointer 30 may be textured or otherwise treated to provide a clear visual contrast with surrounding material. In yet other embodiments, the pointer 30 may have a luminescent or phosphorescent coating for better viewing in low light conditions.

Figure 5A:
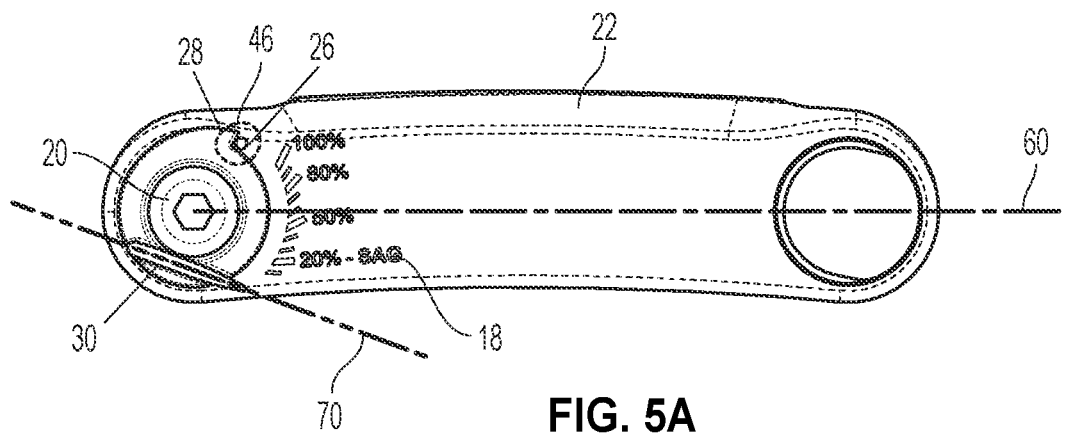
FIG. 5A is a side view the travel indicator of FIG. 2 in an extended beginning state.
Figure 5B:
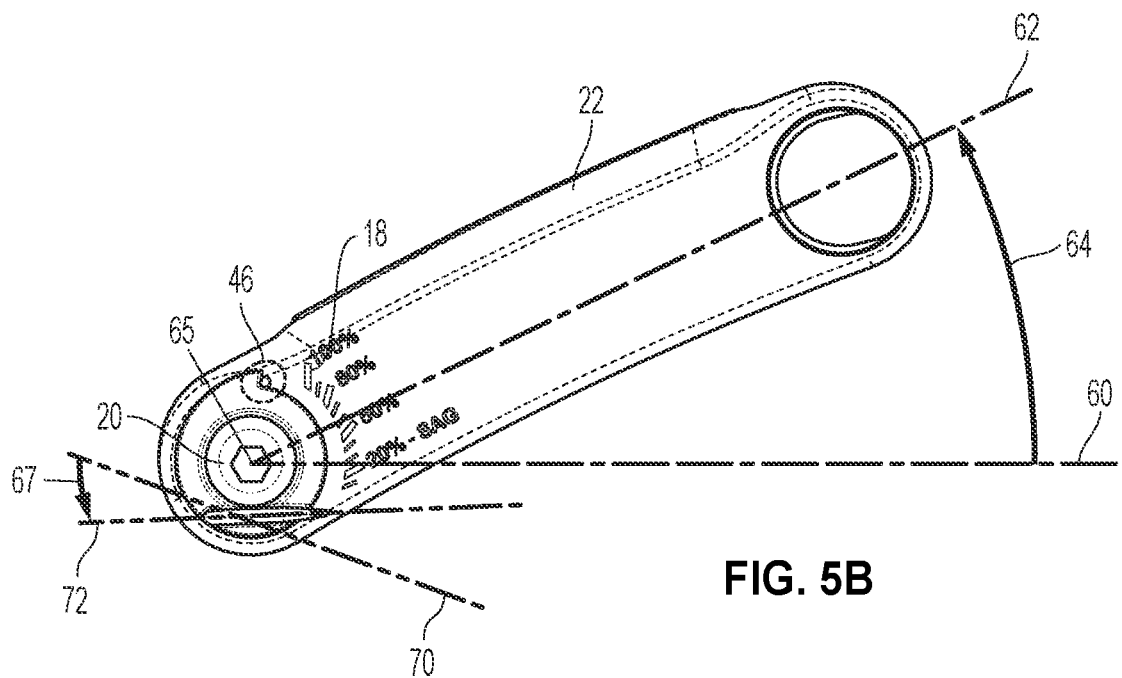
FIG. 5B is a side view of the travel indicator of FIG. 2 in an intermediate actuated state.
Figure 5C:
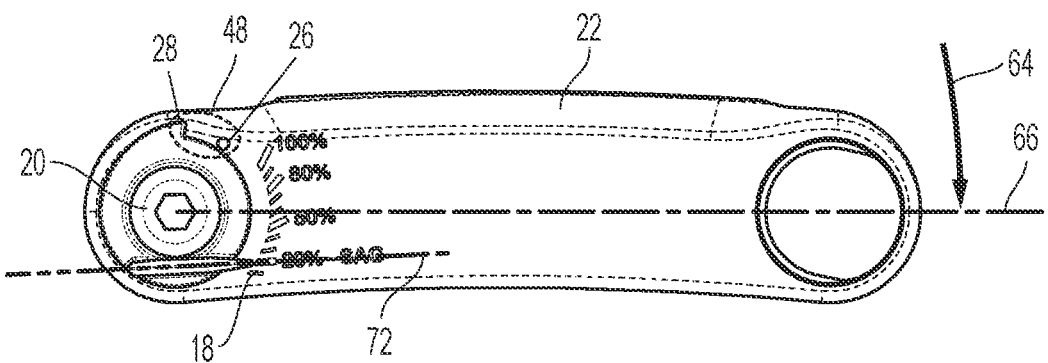
FIG. 5C is a side view of the travel indicator of FIG. 2 returned to the extended state after actuation.

Turning now to FIGS. 5A-5C, the function and reading of the indicator 16 and the scale 18 are illustrated. The link 22 rotates in an arc 64 about the central axis 65 of the pivot assembly 20 during suspension travel (e.g., compression). As illustrated in FIG. 5A, the indicator 16 is in a resting position where the actuator 26 and stop member 28 are in contact at 46. The contact at 46 between the actuator 26 and stop member 28 is illustrated with a dashed circle in FIG. 5A. The link 22 has a first link axis 60 that is defined by a line that passes through the rotational axes of the pivot assemblies 20 in the link 22. The pointer 30 has a first indicator direction 70 that is defined by a line that passes through the center of the pointer 30 when being viewed in a direction axial to the central axis of the pivot assembly 20 (e.g., face-on to the indicator 16).

As illustrated in FIG. 5B, as the suspension assembly compresses, the link 22 rotates in the arc 64. As the link 22 rotates, the actuator 26 remains engaged with the stop member 28 and the actuator 26 pushes the stop member 28 in the direction of rotation (counterclockwise in FIGS. 5A-5C) because the actuator 26 is rotating with the link 22. The pointer 30 rotates as the link 22 rotates due to the interaction between the actuator 26 and the stop member 28 described above. The maximum angular displacement 67 of the pointer 30 is equal to the maximum angular displacement 64 of the link 22. Thus, as the link 22 rotates, the contact at 46 between the actuator 26 and the stop member 28 causes the indicator 16 and thus the pointer 30 to rotate in relation to the pivot assembly 20, more specifically relative to the bolt 2 (FIG. 2C).

As illustrated in FIG. 5C after the suspension is compressed, it returns to an uncompressed state where the link 22 rotates back to its original position when the cycle suspension is at full extension. Because the actuator 26 moves in a direction away from the stop member 28 (e.g., in the clockwise direction in FIGS. 5A-5C) during extension of the suspension assembly, the actuator 26 separates from the stop member 28 and there is no longer a force significant enough to produce relative movement between the indicator 16 and the bolt 2. More specifically, the friction produced by the protrusion 34 on the indicator and the channel 40 on the bolt 2 is sufficient to prevent any further relative movement between the indicator 16 and the bolt 2. The separation 48 between the actuator 26 and stop member 28 is illustrated with a dashed oval. As illustrated in FIG. 5C, when the link 22 returns to its original (uncompressed) position, the angular relationship between the first link axis 60 and indicator alignment 72 is different than the angular relationship between the first link axis 60 and indicator direction 70 prior to suspension displacement (FIG. 5A) and as explained in further detail herein is reflective of the travel distance measurement that occurred during displacement. As the link 22 returns to its uncompressed original position, the scale 18 rotates (clockwise in FIGS. 5A-5C) with the link 22, thus changing a relative position between the scale 18 and the pointer 30. With the suspension fully extended, the user can view the pointer 30 and the scale 18, which indicates the amount of suspension travel that occurred during the compression event of the suspension assembly. For example, in the embodiment illustrated in FIGS. 5A-5C, the pointer indicates that 20% of suspension travel has been used during prior suspension displacements, as indicated by the pointer 30 being aligned with the 20% mark on the scale 18.

Figure 6:
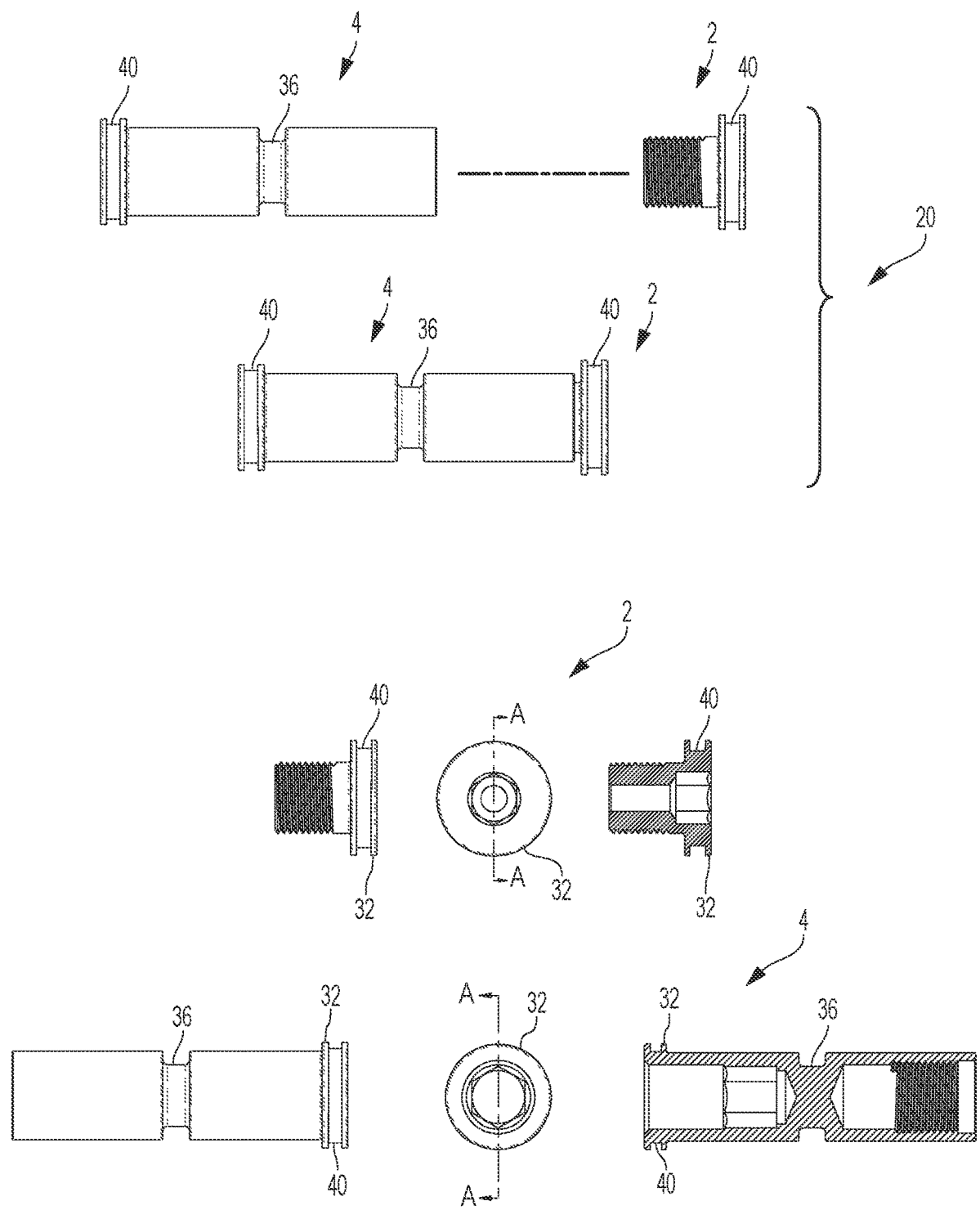
FIG. 6 illustrates various views of a pivot assembly.

Turning now to FIG. 6, in one embodiment, the pivot assembly 20 includes various subcomponents that are arranged to connect links 22 to each other or to connect a link to a frame member 24. A pivot assembly 20 includes a pivot body 4 and a bolt 2. The bolt 2 can form a cap 32 of the pivot assembly 20. The second retention feature 40 may be formed on one or both of the pivot body 4 and the bolt 2. In certain embodiments the pivot body 4 may include a slot 36 that can be used for purposes other than interfacing with an indicator. The cap 32 may be removably joined to the pivot body 4 by a threaded connection located at an end of the pivot body 4. The bolt 2 can likewise include a threaded connection such that when connected to the pivot body 4 by the threaded connection, an axial clamping force is produced. In other embodiments the pivot body 4 may include threads at both ends which can connect to bolts 2 at each end, such that when assembled to a pivot body 4 by threading, the cap 32 of the first bolt 2, and the cap 32 of the second bolt 2 produce an axial clamping force. The pivot body 4 and the bolt 2 can include one or more tool interfaces that can be used to connect with a tool to provide a means of rotating the pivot body 4 and/or the bolt 2 during assembly.

In alternate embodiments, threads can be either internal or external on the pivot body 4 or on the bolt 2. In other embodiments, the slot 36 can be fully formed about the diameter of the pivot body 4, or formed as a partial slot 36. In yet other embodiments, the slot 36 may be formed in the bolt 2.

As illustrated in the figures, the first and second retention features 34, 40 provide a captured mounting mechanism for the indicator 16, which locates the indicator 16 axially on the bolt 2 while allowing rotational movement between the indicator 16 and the bolt 2 when sufficient force is applied to overcome rotational friction. In certain embodiments, the first retention feature 34 may be any one or more of a tab, a slot, a bump, a hole, a protrusion, a depression, a boss, a flap, or any other type of feature that can mate or interface with a corresponding second retention feature 40. In certain embodiments, the second retention feature 40 may be any one or more of a tab, a slot, a bump, a hole, a protrusion, a depression, a boss, a flap, or any other type of feature that can mate or interface with a corresponding first retention feature 34. Interference features 34, 40 may cooperate with other surfaces or other parts such as the pivot bodies 4, the bolts 2, the links 22, and/or the frame members 24 to allow rotation of the indicator 16 and at the same time allow for enough rotational interference friction that the indicator 16 can be rotated back to an original position by the actuator 26 or by a human finger if registration of a new travel displacement measurement is desired, and also allow for enough rotational interference friction to hold the indicator 16 in place when not being acted upon outside forces, such as the actuator 26 or the human finger, such that a prior travel displacement measurement can be observed and registered.

In certain embodiments, the actuator 26 may be any one or more of a tab, a slot, a bump, a hole, a protrusion, a depression, a boss, a flap, or any other type of feature that can mate or interface with the stop member 28. In certain embodiments, the stop member 28 may be any one or more of a tab, a slot, a bump, a hole, a protrusion, a depression, a boss, a flap, or any other type of feature that can mate or interface with the actuator 26. The first and stop members 26, 28 may cooperate with other surfaces or other parts such as the pivots bodies 4, the bolts 2, the links 22, and/or the frame members 24 to cause rotation of the indicator 16 when there is contact 46 between the actuator 26 and stop member 28.

The scale 18 cooperates with the indicator 16 to indicate an amount of suspension travel displacement that occurs during suspension assembly compression. The scale 18 includes graduations cooperate with the pointer 30 of the indicator 16, allowing the user read an indication of the amount of travel that has occurred, and therefore allowing the rider to use the indicated travel to make changes to suspension settings, thereby altering suspension performance to achieve a desired result. The scale 18 of may include any one or more of printing, pad printing, decals, engraving, painting, electropainting, anodizing, etching, laser etching, chemical etching, screen printing, water transfer decal, molded in marks, bosses, indentations, or other methods of creating a visual marker on a link. The scale 18 may include the following information including, either alone or in any combination, and not limited to; graduation, value, percentage, displacement, measurement, sag, min, max, specific travel amounts in percentage and/or absolute displacement (measurement), angle, and other information intended to inform the user about suspension travel displacement or help the rider to determine setup.

The pointer 30 is located an offset distance 44 from the center 35 of the indicator 16. This offset distance 44 is an important feature of the indicator 16 that allows the user to easily and accurately read the suspension travel. By locating the pointer 30 offset 44 from the center of the indicator 16, the pointer 30 can be much longer than in other arrangements. The longer pointer 30 is valuable compared to shorter pointers such as one that might be located along a radius of the indicator 16 and originating at a center 37 of the indicator and using no offset 44. Pointers originating in the center are necessarily small given the small radii of existing pivots, which are 25 mm or less and usually 15 mm or less.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. The same reference numbers may be used to describe like or similar parts. Further, while several examples have been disclosed herein, any features from any examples may be combined with or replaced by other features from other examples. Moreover, while several examples have been disclosed herein, changes may be made to the disclosed examples within departing from the scope of the claims.

A variety of modifications, alterations, and combinations can be made with respect to the above described embodiments without departing from the scope of the invention, and that such modifications, alterations, and combinations are to be viewed as being within the scope of the inventive concept.

What is claimed:

1. A suspension assembly for a bicycle, the suspension assembly comprising:
    a first suspension member that comprises a first link;
    a second suspension member that comprises one of a second link or a frame member, the first suspension member being rotatably coupled to the second suspension member;
    a pivot body that at least partially defines a pivot axis about which the first suspension member can rotate with respect to the second suspension member;
    a bolt coupled to the pivot body; and
    an indicator rotatably coupled to the bolt,
    wherein the indicator is configured to use rotational friction to remain in a fixed rotational orientation with respect to at least one of the first suspension member, the second suspension member, or the bolt until a threshold force is exceeded, and wherein the indicator comprises a stop member positioned to interface with a surface of at least one of the first suspension member, the second suspension member, or the bolt during at least a portion of rotational movement of the first suspension member with respect to the second suspension member, in order to cause the threshold force to be exceeded during the at least a portion of rotational movement of the first suspension member with respect to the second suspension member.

2. The suspension assembly of claim 1, wherein the indicator is located about a circumference of the bolt.

3. The suspension assembly of claim 1, wherein the indicator comprises a central opening through which the pivot axis passes.

4. The suspension assembly of claim 1, wherein the pivot body, the bolt, and the indicator are each centrally aligned with the pivot axis.

5. The suspension assembly of claim 1, further comprising a first bearing and a second bearing each centrally aligned with the pivot axis, and
    wherein the bolt and pivot body are configured to apply an axial clamping force to the first bearing and the second bearing.

6. The suspension assembly of claim 1, wherein the stop member comprises at least one of a tab, a slot, a bump, a hole, a protrusion, a depression, a boss, or a flap.

7. The suspension assembly of claim 1, wherein the surface with which the stop member is positioned to interface is part of an actuator that comprises at least one of a tab, a slot, a bump, a hole, a protrusion, a depression, a boss, or a flap.

8. The suspension assembly of claim 1, wherein the indicator is axially retained to the bolt by at least one of a tab, a slot, a bump, a hole, a protrusion, a depression, a boss, or a flap.

9. The suspension assembly of claim 1, wherein the bolt comprises a tool interface.

10. The suspension assembly of claim 1, wherein the first suspension member is part of a front wheel suspension assembly.

11. The suspension assembly of claim 1, wherein the first suspension member is part of a rear wheel suspension assembly.

12. A suspension assembly for a bicycle, the suspension assembly comprising:
    a first suspension member that comprises a first link;
    a second suspension member that comprises one of a second link or a frame member, the first suspension member being pivotably coupled to the second suspension member about a pivot axis;
    an indicator comprising:
        an annular body having a central opening through which the pivot axis passes;
        a stop member positioned to engage an actuator during at least a portion of pivoting of the first suspension member with respect to the second suspension member, in order to overcome a rotational friction and cause rotation of the indicator with respect to at least one of the first suspension member or second suspension member during the at least a portion of pivoting of the first suspension member with respect to the second suspension member; and
        a pointer extending radially outwardly from the annular body.

13. The suspension assembly of claim 12, wherein the stop member extends radially outwardly from the annular body of the indicator.

14. The suspension assembly of claim 12, wherein the stop member comprises at least one of a tab, a bump, a protrusion, or a boss that extends from the annular body.

15. The suspension assembly of claim 12, wherein the pointer is offset from the pivot axis.

16. The suspension assembly of claim 12, wherein the indicator further comprises one or more protrusions extending radially inwardly from the annular body.

17. The suspension assembly of claim 12, wherein the rotational friction is generated radially inwardly of the annular body.

18. The suspension assembly of claim 12, wherein the actuator comprises at least one of a tab, a slot, a bump, a hole, a protrusion, a depression, a boss, or a flap.

19. The suspension assembly of claim 12, wherein the first suspension member is part of a front wheel suspension assembly.

20. The suspension assembly of claim 12, wherein the first suspension member is part of a rear wheel suspension assembly.

* * * * *